United States Patent
Shen et al.

(10) Patent No.: US 11,797,561 B2
(45) Date of Patent: Oct. 24, 2023

(54) REDUCING CHARACTER SET CONVERSION

(71) Applicant: International Business Machines Corporation, Armonk, NY (US)

(72) Inventors: Hai Jun Shen, Beijing (CN); Chang Sheng Liu, Beijing (CN); Ya Qiong Liu, Beijing (CN); Jun Hui Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 17/173,342

(22) Filed: Feb. 11, 2021

(65) Prior Publication Data

US 2022/0253455 A1    Aug. 11, 2022

(51) Int. Cl.
*G06F 16/25*    (2019.01)
*G06F 40/126*    (2020.01)

(52) U.S. Cl.
CPC .......... *G06F 16/258* (2019.01); *G06F 16/252* (2019.01); *G06F 16/256* (2019.01); *G06F 40/126* (2020.01)

(58) Field of Classification Search
CPC .... G06F 16/252; G06F 16/256; G06F 16/258; G06F 40/126
See application file for complete search history.

(56) References Cited

U.S. PATENT DOCUMENTS

| | | | |
|---|---|---|---|
| 5,566,332 A | 10/1996 | Adair et al. | |
| 6,370,531 B1 * | 4/2002 | Boutcher | G06F 16/258 |
| 7,051,278 B1 | 5/2006 | Ehrman | |
| 7,149,964 B1 * | 12/2006 | Cottrille | G06F 40/129 |
| | | | 704/8 |
| 7,218,252 B2 | 5/2007 | Fauque | |

(Continued)

FOREIGN PATENT DOCUMENTS

EP    0336579 A2 *    3/1989    ............. G06F 15/40

OTHER PUBLICATIONS

"Configuring message flows for data conversion", IBM App Connect Enterprise, Version 11.0.0.10 Operating Systems: AIX, Linux, Windows, Last updated: Oct. 27, 2020, 5 pages. https://www.ibm.com/support/knowledgecenter/SSTTDS_11.0.0/com.ibm.etools.mft.doc/ac12380_.html.

(Continued)

*Primary Examiner* — Apu M Mofiz
*Assistant Examiner* — J Mitchell Curran
(74) *Attorney, Agent, or Firm* — Daniel M. Yeates (57) ABSTRACT

A computer-implemented method reduces the number of character set conversions in a distributed data virtualization system. The method includes receiving, from a first application, a first request for a set of data, including a requested codepage, stored in a first data source of a plurality of data sources. The method includes obtaining, by a connector, from the first data source, a first codepage associated with the first data source, which identifies a character set associated with the set of data. The method also includes adding a virtual coded character set identifier (VCCSID) in a first catalog entry of a catalog, wherein the first VCCSID is added to a nickname column of the catalog. The method includes obtaining and sending the set of data to the data application while allowing maximum of one codepage conversion.

20 Claims, 5 Drawing Sheets

(56) References Cited

U.S. PATENT DOCUMENTS

| | | | |
|---|---|---|---|
| 7,278,100 B1 | 10/2007 | Ehrman | |
| 10,461,772 B1 | 10/2019 | Deng et al. | |
| 2002/0052902 A1* | 5/2002 | Bauer | G06F 40/126 |
| | | | 715/256 |
| 2005/0184886 A1* | 8/2005 | Fauque | G06F 40/126 |
| | | | 341/50 |
| 2005/0289132 A1 | 12/2005 | Lee | |
| 2006/0036616 A1* | 2/2006 | Bastawala | G06F 16/24539 |
| 2008/0048044 A1* | 2/2008 | Zhao | G06K 7/1417 |
| | | | 235/494 |
| 2012/0030375 A1* | 2/2012 | Schulenburg | H04L 67/06 |
| | | | 707/756 |
| 2014/0266818 A1 | 9/2014 | Laviolette | |

OTHER PUBLICATIONS

Zaino, "Data Virtualization for a Hybrid World", Data Topics, Dataversity, Published Date: Sep. 26, 2019, 9 pages. https://www.dataversity.net/data-virtualization-for-a-hybrid-world/.

Mell et al., "The NIST Definition of Cloud Computing", Recommendations of the National Institute of Standards and Technology, Special Publication 800-145, Sep. 2011, 7 pages.

\* cited by examiner

REDUCING CHARACTER SET CONVERSION

BACKGROUND

The present disclosure relates to database management, and, more specifically, to reducing character set conversion in data virtualization systems.

Many modern data virtualization systems are configured to retrieve and compile data from more than one database. At times the databases can include different configurations including the character sets used to store the data.

SUMMARY

Disclosed is a computer-implemented method to reduce the number of codepage/character set conversions in a data virtualization system. The method includes receiving, from a first application, a first request for a set of data, wherein the set of data is stored in a first data source of a plurality of data sources and the first request includes a requested codepage. The method also includes obtaining, by a connector, from the first data source, a first codepage associated with the first data source, wherein the first codepage identifies a character set associated with the set of data. The method also includes adding a first virtual coded character set identifier (VCCSID) in a first catalog entry of a catalog, wherein the first VCCSID is added to a nickname column of the catalog. The method includes obtaining the set of data from the first data source. The method also includes allowing a maximum of one codepage conversion. The method further includes returning the set of data to the application, and displaying the set of data.

Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
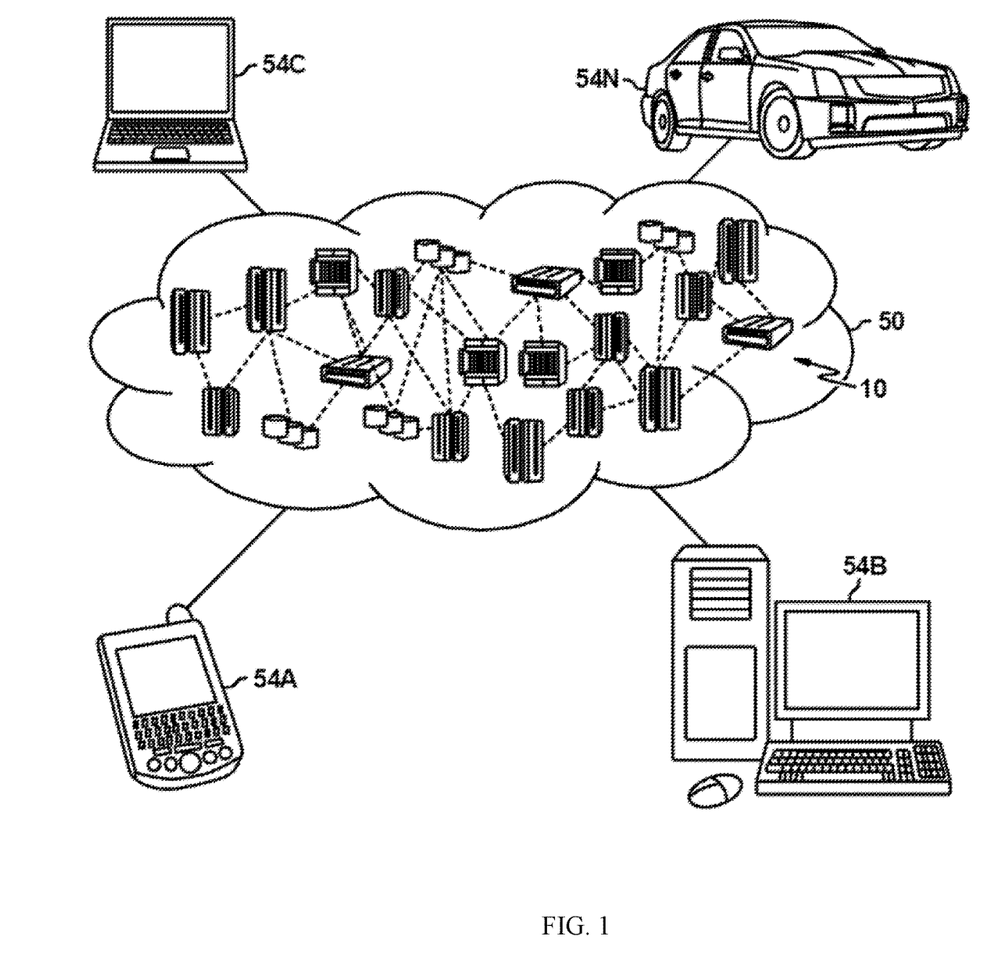
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
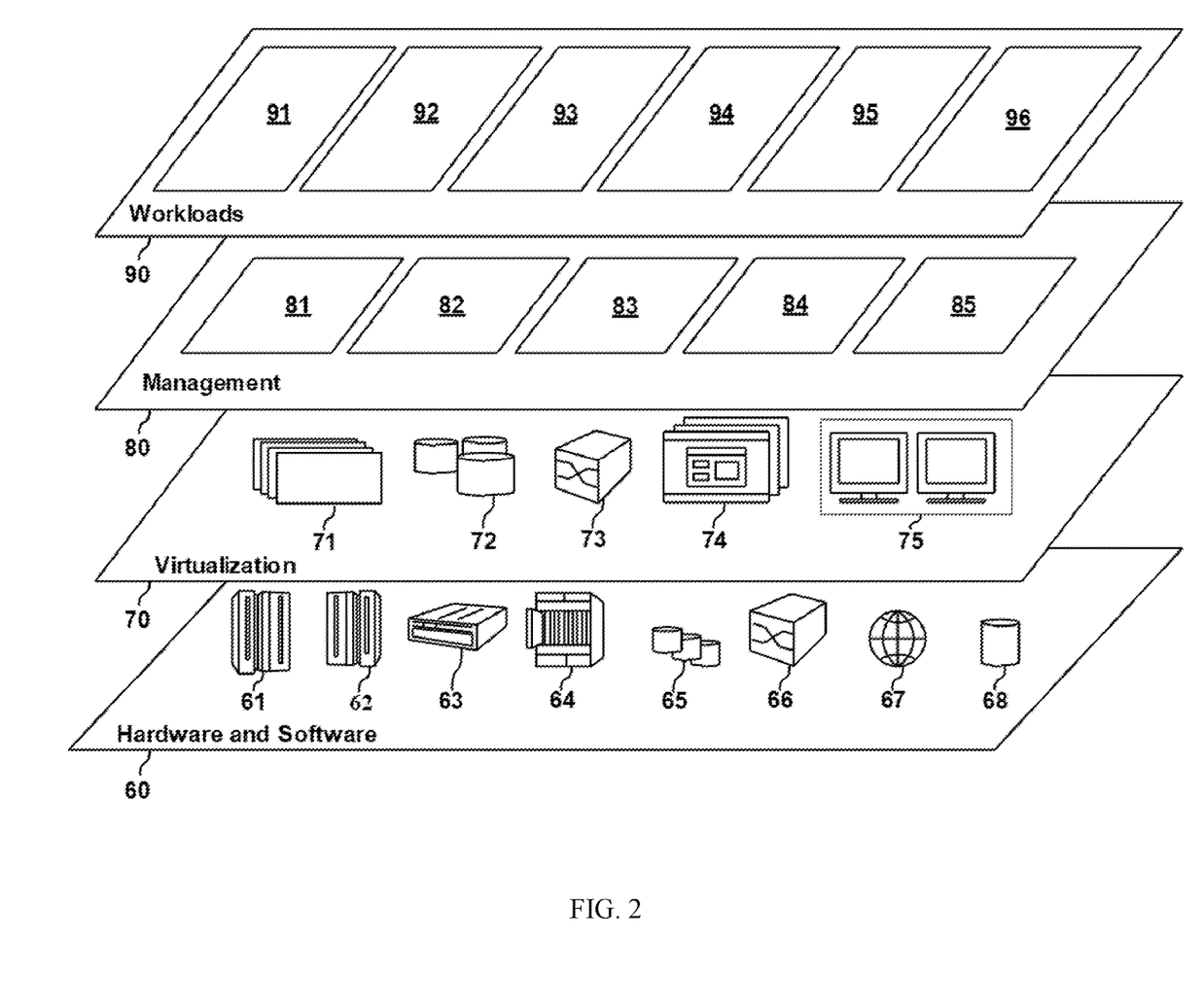
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and reducing character set conversion 96.

Data Processing System in General

Figure 3:
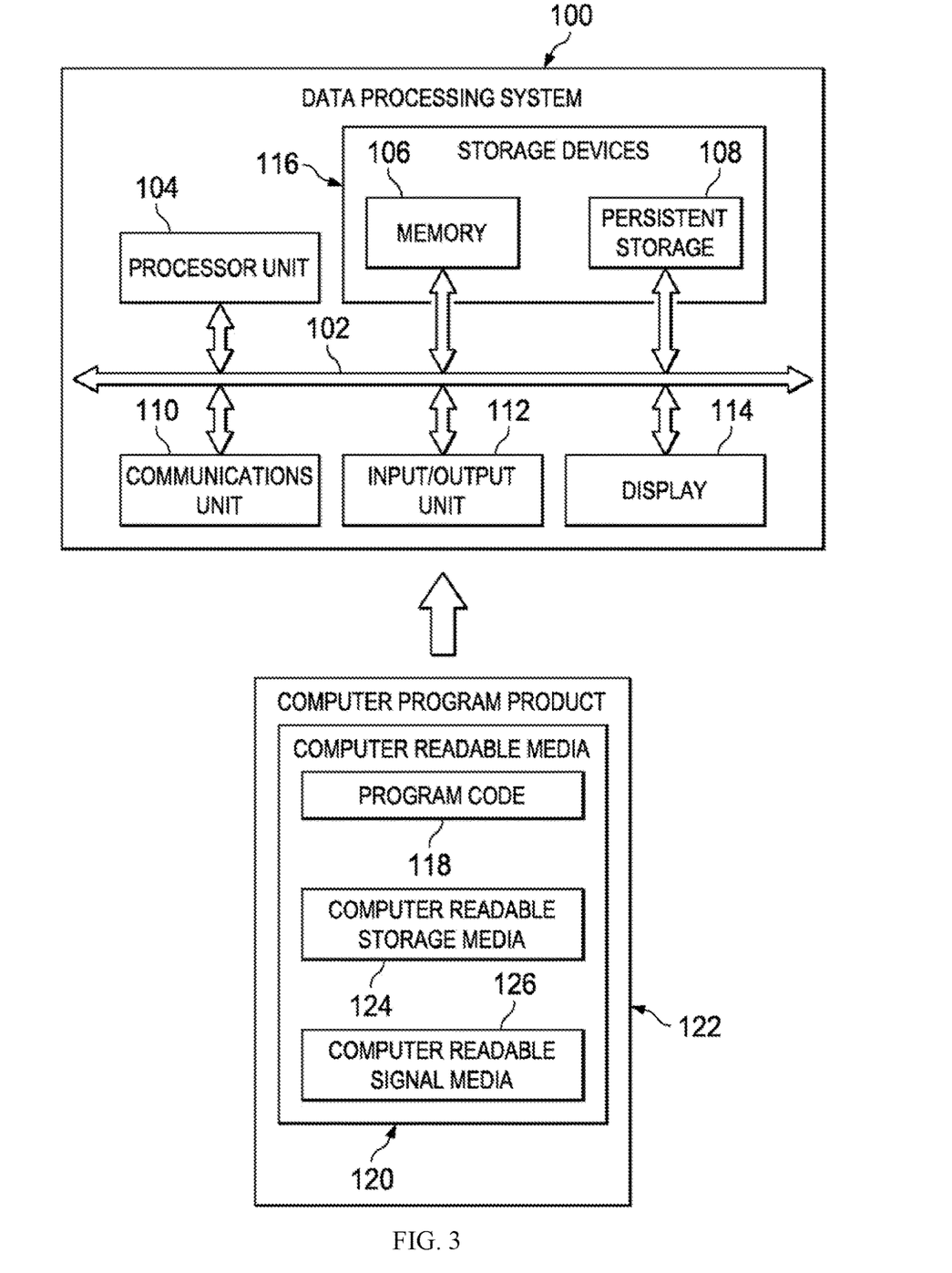
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an input/output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Reducing Character Set Conversion

The present disclosure relates to database management, and, more specifically, to reducing character set conversion in data virtualization systems.

Many modern data virtualization systems can be integrated into cloud computing systems. They can be configured to retrieve and compile data from more than one database. At times, the databases can include different configurations including the character sets/codepages used to store the data. A character set is the set of characters that can be displayed. Generally, the character set will include most/all of the characters necessary to allow meaningful interactions with a computing device. A codepage can represent a particular mapping of a character set. A coded character set identifier (CCSID) can contain all the information necessary for rendering characters through processing. A CCSID will include at least one code page, but may include more than one.

Each time data is converted between character sets, there is a potential for issues to develop. Conversions can lead to messy/confusing code, truncated/incorrect data display or data entry, and/or additional computing cost of conversion. Additionally, different databases/configurations/data structure can define a codepage at different levels of specificity. For example, a first database can have a database level codepage, and a second column level codepage. The different/multiple levels of specificity can exacerbate the above issues.

Embodiments of the present disclosure seek to leverage the knowledge that reducing the number of character set conversions can lead to an increase in the overall efficiency of some computing systems.

Embodiments of the present disclosure include a virtualization manager to address some/all of the identified issues. In some embodiments, an application can issue a data request. The data request can include a virtualization process to be performed by a virtualization manager. The request can be directed to one or more data sources and include a requested codepage. The requested codepage can identify the character set/codepage that will be used to display the results of the data request.

Embodiments of the present disclosure can reduce the number of times character set/codepage conversions occur. In some embodiments, the virtualization manager can limit the conversion to, at most, a single conversion or a maximum of one conversion for each data source. In some embodiments, the virtualization manager adds/uses a virtual coded character set identifier (VCCSID). The conversion can occur when the retrieved data is stored with a different codepage than the requested codepage.

Embodiments of the present disclosure can improve a database connector. The database connector provides an interface for a device to retrieve/send data to the database. In some embodiments, the connector can include a column character set description. Prior to fetching/sending the data to a database, the connector can retrieve, prior to retrieve/sending data to the source, a column level codepage for all the relevant columns, tables, and/or databases included in the request. The column level codepage can be mapped and stored as the VCCSID. In some embodiments, the VCCSID is added to a nickname column in a catalog. The catalog can be compared to the requested codepage. For a particular column, if the requested codepage matches the nickname/VCCSID, no conversion is necessary for that data column. If the requested codepage does not match the nickname/VCCSID, the single codepage conversions can be performed before/concurrently with returning the requested data to the application. In some embodiments, the virtualization is performed at the column level of the retrieved data. The comparison and/or conversion can be performed for each column of retrieved data.

The above can be applied to writing/altering data. Based on the request from an application, the virtualization manager can retrieve the relevant codepages, data length, and other attributes of the target. The character set can be transformed a single time, if the original codepage and the destination codepage are different, The aforementioned advantages are example advantages, and embodiments exist that can contain all, some, or none of the aforementioned advantages while remaining within the spirit and scope of the present disclosure.

Figure 4:
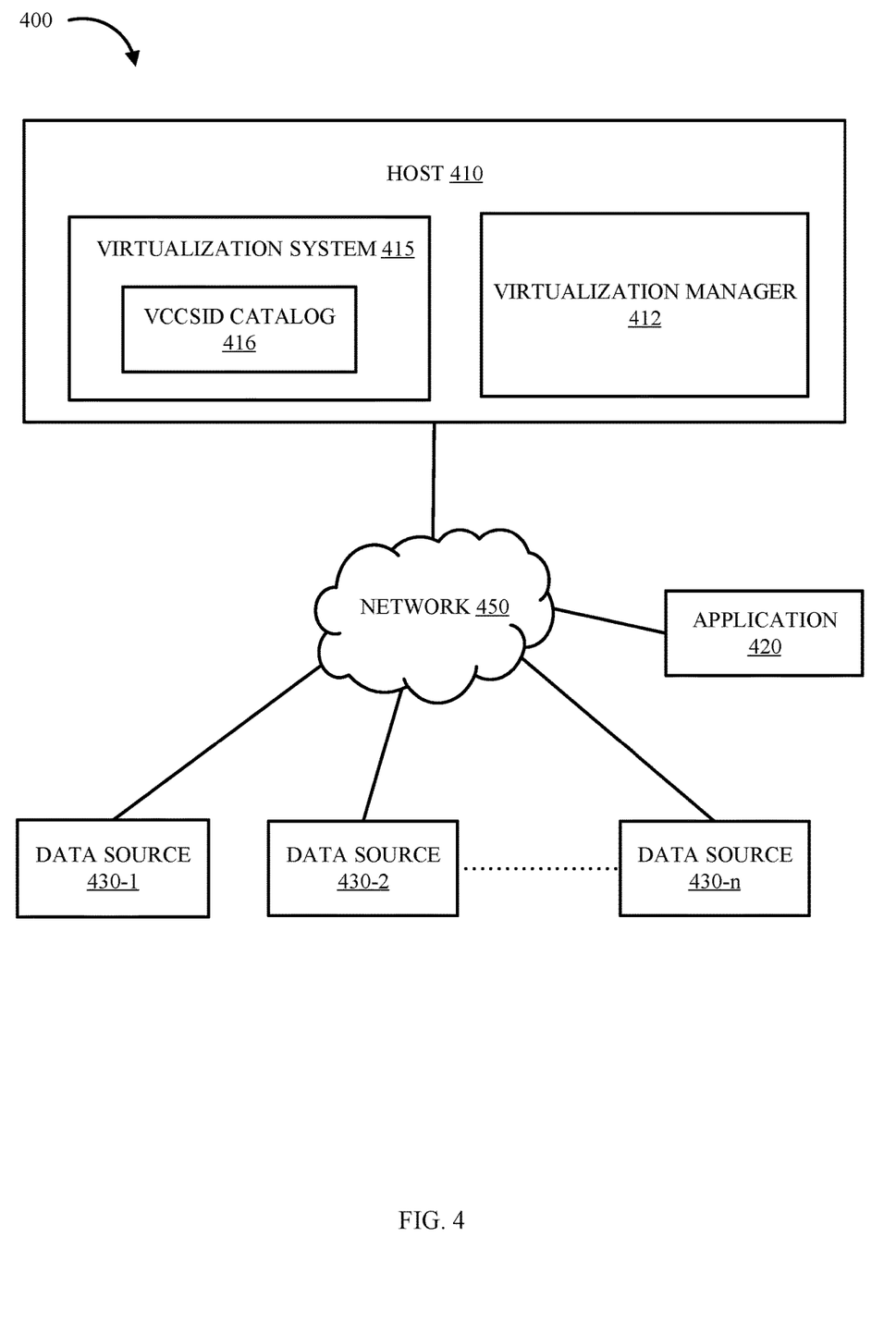
FIG. 4 illustrates a functional diagram of a computing environment suitable for operation of a virtualization manager in accordance with some embodiments of the present disclosure.

Referring now to various embodiments of the disclosure in more detail, FIG. 4 is a representation of a computing environment 400, that is capable of running a virtualization manager in accordance with one or more embodiments of the present disclosure. Many modifications to the depicted environment may be made by those skilled in the art without departing from the scope of the disclosure.

Computing environment 400 includes host 410, application 420, data source 430-1, data source 430-2 through data source 430-n, where n is an integer. Data source 430-1, data source 430-2 through data source 430-n can be referred to individually, collectively, or representatively as data source 430.

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, virtualization system 415, application 420, data source 430, and other computing devices (not shown) within computing environment 400. In some embodiments, host 410, virtualization system 415, application 420, data source 430 may include a computer system, such as the data processing system 100 of FIG. 3. In some embodiments, computing environment 400 can be consistent with a cloud computing environment (e.g., cloud computing environment 50). In some embodiments, each of host 410, virtualization system 415, application 420, data source 430 can be combined with any of the components of computing environment 400 in any combination. For example, application 420 can be included in host 410 or data source 430.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment. In some embodiments, host 410 includes virtualization manager 412, and virtualization system 415.

Virtualization manager 412 can be any combination of hardware and/or software configured to retrieve, manipulate, and prepare data for display. In some embodiments, virtualization manager includes data virtualization system 415. In some embodiments, virtualization manager 412 limits the number of codepage conversions that occur on a data set. In some embodiments, at most, a single data conversion is permitted. A data set for this purpose is data that is requested by, retrieved for, and displayed to a task of an application. While some tasks may include the streaming of data, the conversion of that data can occur at a similar location in the data pipeline and be considered limited as previously described.

Virtualization system 415 can be any combination hardware and/or software configured to arrange and/or display data to one or more users. Data virtualization system 415 can provide a single customer view of data from one or more different sources (e.g., private cloud and public cloud). It can aggregate, analyze and/or manipulate data that is retrieved/stored in different physical locations, from different formats, different sources, and the like.

In some embodiments, virtualization system 415 can convert data between codepages. The conversation can be performed at multiple locations. For example, the conversion can occur between the data source and the connector, between the connector and virtualization system 415, and/or between virtualization system 415 and application 420. In some embodiments, a single code page conversion is permitted. Accordingly, a second code page conversion will be prohibited. In some embodiments, the conversion can occur at a specified location. That location can be between virtualization system 415 and application 420. In some embodiments, no code page conversion is performed between a data source and the connector and/or the connector and virtualization system 415.

In some embodiments, virtualization system 415 uses one or more connectors to obtain/receive data from a data source (e.g., data source 430). A connector can be any software that provides data transfer interface between a device and a database. In some embodiments, the connector uses Java database connectivity (JDBC). In some embodiments, open database connectivity (ODBC) interface. ODBC can use standard query language (SQL) to allow the application to access data. In some embodiments, the connector uses two or more connection types to retrieve/obtain data. In some embodiments, the connector can obtain data for each data source. The data can include one or more of data source type, schema, table name, column name, character type, column size, codepage, and other similar attributes. This data can be obtained for each data source, data base, schema, table, and/or column.

In some embodiments, virtualization system 415 includes a catalog 416. In some embodiments, catalog 416 can be a VCCSID catalog. Catalog 416 can map each data source to a codepage used for that data source. In some embodiments, catalog 416 can map the data to a column level. In some embodiments, each entry of catalog 416 can include a nickname column. The nickname can link the specific attributes of a data source to a particular codepage used for that data source.

Application 420 can be any combination of hardware and/or software configured to carry out a function on a computing device (e.g., host 410). In some embodiments, application 416 is a web application. In some embodiments, application 420 can include functionality to virtualize data. In some embodiments, application 420 can include virtualization system 415. In some embodiments, application 420 can utilize virtualization system 415. In some embodiments, application 420 is configured to use a particular codepage/character set. The relevant codepage can be sent to virtualization manager 412/virtualization system 415 with the data request. In some embodiments, application 420 includes one or more target data sources with the data request.

In some embodiments, application 420 can represent two or more separate applications. The two or more applications can be located in the same and/or different computing devices. In some embodiments, the two or more applications can utilize a similar set of data. For example, the first application and the second application can be configured to perform a similar or identical virtualization task, and/or use a subset of common data. Virtualization manager 412 can retrieve the data only one time and send the virtualized data back to each respective application. In some embodiments, the two or more applications are configured to utilize different codepages. For example, a first application can use a first character set and a second application can use a second character set.

Data sources 430 can be any combination of hardware and/or software configured to store and/or organize data. In some embodiments, data sources 430 include one or more storage systems. The storage system can include any hardware/software for long-term storage and/or organization of data. In some embodiments, data sources 430 can be a cloud computing system as described above with respect to FIGS. 1, 2, and 3. In some embodiments, data sources 430 can include any number of private cloud systems, and/or any number of public cloud systems. For example, data source 430-1 can be a first private cloud, data source 430-2 can be a second private cloud, data source 430-3 can be a first public cloud, and data source 430-4 can be a second public cloud.

In some embodiments, any and/or all of the data sources can be a source for application 420. In some embodiments, one or more data sources 430 can provide data (or be a target of a data retrieval action) for an action performed by application 420. The action can be any action that retrieves data and provides an output. The action can be one or more of a task, a query, a visualization, an analysis, and the like.

In some embodiments, data source 430 can define/include a configuration that can include a codepage. The codepage can determine which character set is used to identify the data. In some embodiments, data source 430 can include one or more databases (e.g., partition), where each database includes one or more tables, and each table includes one or more columns. The codepage can be specific to any level of organization with data source 430. For example, data source 430-1 can have a data source level configuration and as such, has a single codepage. Data source 430-2 can have a second configuration, where each table is configured to use a particular codepage. Data source 430-3 can have a column level configuration, where each column is configured to use a particular codepage.

Figure 5:
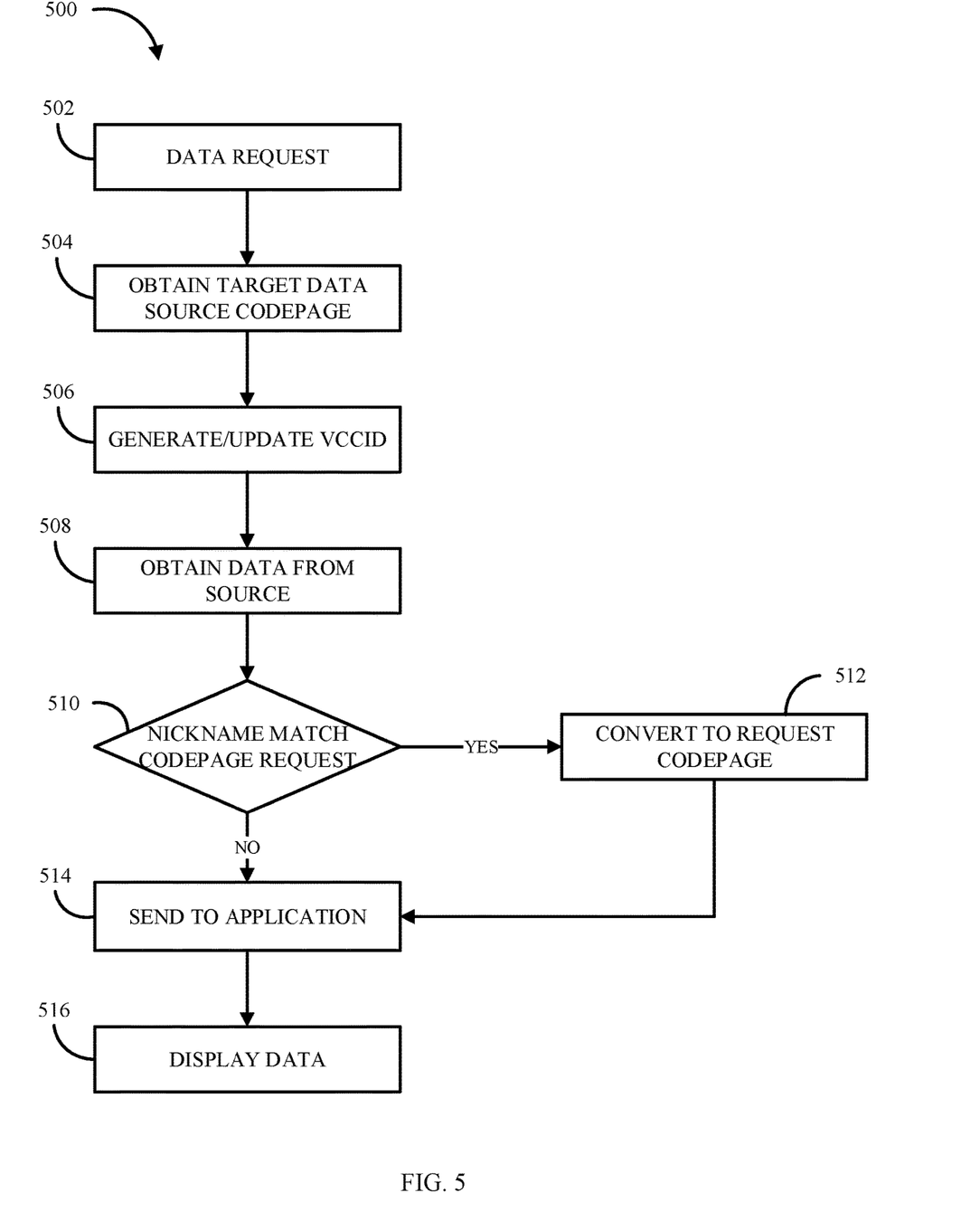
FIG. 5 illustrates a flow chart of an example method to reduce character set conversions, in accordance with some embodiments of the present disclosure.

FIG. 5 depicts a flowchart of an example method, method 500, for reducing codepage conversions in a cloud computing system that can be performed in a computing environment (e.g., computing environment 400 and/or cloud computing environment 50). One or more of the advantages and improvements described above for reducing codepage conversions may be realized by method 500, consistent with various embodiments of the present disclosure.

Continuing reference to FIGS. 4 and 5, method 500 can be implemented by one or more processors, host 410, virtualization manager 412, virtualization system 415, application 420, data source 430 and/or a different combination of hardware and/or software. In various embodiments, the various operations of method 500 are performed by one or more of host 410, virtualization manager 412, virtualization system 415, application 420, data source 430. For illustrative purposes, the method 500 will be described as being performed by virtualization manager 412.

At operation 502, virtualization manager 412 receives a data request. The data request is received from an application (e.g., application 420). The data request can include one or more target data sources and a display codepage. The one or more target sources can be any source that provides data for the data request. The codepage/CCSID that the application is configured to display can be the display codepage.

At operation 504, virtualization manager 412 obtains codepage data for each of the target data sources of the data request. The codepage data can be obtained for each data source, each database (e.g., partition) or each data source, each table, and each column. In some embodiments, the level of specificity (e.g., column level data vs. database level data) is based on the configuration of the data source. In some embodiments, the default is column level. In some embodiments, the default is based on the smallest level of specificity of the data source. If it is known a first database type uses a single codepage for the entire database, then the codepage data can be obtained at the database level. In some embodiments, codepage data can be obtained at varying levels of specificity for different data sources. In some embodiments, the code page data is obtained by a connector. The connector can generate an interface that collects the codepage data prior to fetching the data.

At operation 506, virtualization manager 412 updates/generates a VCCSID catalog (e.g., catalog 416). In some embodiments, the VCCSID catalog is updated in response to obtaining the code page data. In some embodiments, the VCCSID catalog is updated in parallel with obtaining the code page data. To update the catalog, virtualization manager 412 can identify a first column of a first table of a first database. Virtualization manager 412 will obtain the relevant codepage data for the database, table, and column. Virtualization manager 412 can determine if each column has a string data type (e.g., char, varchar, nchar, nvarchar, etc.). A row can be added to the catalog that includes one or more of, data source, table, column, schema, data type (e.g., var, varchar, etc.), length (or data length), and VCCSID/

Nickname. The nickname is linked to the codepage and provides a way to identify relevant codepage without accessing any of the data. If the data type is non-string (e.g., integer, etc.), then a null value can be added to the nickname column. This is repeated for each column in the first table. Virtualization manager 412 can then proceed to a first column of a second table and repeat the process for as many columns in the second table, then a third table and so on. Virtualization manager 412 can then proceed to a second data source, if necessary, and obtain column specific code page data.

At operation 508, virtualization manager 412 obtains the data from the data request. In some embodiments, operations 508 includes allocating resources based on the data length. This is in contrast to some systems where allocations are based on codepage length requirement. The resources can include one or more of bandwidth, storage, processor time, priority, and the like. Allocating resources based on length provides adequate resources to retrieve the data and brings to an intermediate location between the data source and the application (e.g., host 410, virtualization system 415, etc.) without requirement and/or by preventing page code conversion. In some embodiments, allocating resources can include allocate of storage space sufficient to store all of the requested data. In some embodiments, operation 508 includes allocating a buffer with the same length of the data. The length can be obtained by the connecter when retrieving the remote codepage. In some embodiments, the allocation can account for the number of rows needed based on the data request.

At operation 510, virtualization manager 412 determines if nickname column (for each column level codepage) matches the requested codepage. The determination can include comparing the requested codepage to the nickname column of the catalog. The determination can be based on whether the nickname and requested are the same or different. This can occur for each row in the catalog. If the requested codepage matches the nickname (510:YES), then virtualization manager 412 proceeds to operation 514. If the requested nickname does not match the nickname (510:NO), then virtualization manager 412 proceeds to operation 512.

At operation 512, virtualization manager 412 converts the data to the requested codepage. And virtualization manager 412 proceeds to operation 514 in response to converting the data. In some embodiments, the data does not undergo a codepage conversion. This occurs when the requested codepage does match the nickname for the data source.

At operation 514, virtualization manager 412 sends the data to the application. In some embodiments, operation 514 includes formatting the data in according with instruction provided by the application. In some embodiments, virtualization system 415 can format the data per the instructions. At operation 516, virtualization manager 412 displays the virtualized data.

In some embodiments, some or all of the operations in method 500 can be performed simultaneously for multiple data sources. For example, operation 508 through 514 can be performed for a first data source, then loop and be performed for a second data source. Another example, operation 508 through 514 can be performed simultaneously for two data sources based on system availability.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a connector and from a first application, a first request for a set of data, wherein the set of data is stored in a first data source of a plurality of data sources and the first request includes a requested codepage and the requested codepage identifies a character set that will be used to display the results of the data request;
obtaining, by the connector, from the first data source, a first codepage associated with the first data source, wherein the first codepage identifies a character set associated with the set of data, the first data source is a remote data source, and the connector obtains a column level codepage for relevant columns;
adding, by a virtualization manager a first virtual coded character set identifier (VCCSID) in a first catalog entry of a catalog for the first codepage, wherein:
the first VCCSID is added to a nickname column;
the catalog entry with the first VCCSID identifies the first codepage and the set of data; and
the adding of the first VCCSID is on a new row of the first catalog;
determining, by the virtualization manager, the requested codepage does not match the VCCSID;
obtaining, by the connector, the set of data from the first data source;
performing, by the virtualization manager and in response to the determining, a codepage conversion on the set of data, wherein the conversion includes a character set conversion;
allowing a maximum of one codepage conversion;
returning, by the connector, the set of data to the application; and
displaying the set of data.

2. The method of claim 1, wherein the maximum of one codepage conversion is in response to determining the requested codepage does not match the first VCCSID.

3. The method of claim 2, further comprising:
receiving, from a second application, a second request for a second set of data, wherein the set second of data is stored in a second data source and the second request includes a second requested codepage;
obtaining, from the second data source, a second codepage, wherein the second codepage identifies a second character set associated with the second set of data;
adding a second VCCSID to the catalog, wherein the second VCCSID is added to the nickname column of the catalog;
determining the second requested codepage matches the second VCCSID; and
sending the second set of data to the second application, wherein the second set of data does not undergo a codepage conversion.

4. The method of claim 1, wherein the first data source is a first column.

5. The method of claim 4, wherein;
the first data source is one of a plurality of data sources, wherein each data source of the plurality of remote data sources has an associated codepage;
the first column includes a first portion of the set of data; and
a second portion of the set of data is stored in a second data source of the plurality of remote data sources, the second data source is associated with a second codepage, and the second data source is a second column.

6. The method of claim 5, wherein the first codepage is different than the second codepage.

7. The method of claim 4, wherein the obtaining further includes, obtaining a data type of the first column and a data length associated with the first column.

8. The method of claim 7, the method further comprising: allocating, based on the column length, resources to receive the set of data.

9. The method of claim 8, wherein the obtaining the set of data from the first data source is in response to the allocating the resources.

10. The method of claim 7, wherein the data type and the data length are included in the first entry.

11. The method of claim 10, wherein adding the first VCCSID to the first entry is in response to determining the data type is a string data type.

12. The method of claim 11, wherein the string data type is selected from the group consisting of char, varchar, nchar, and nvarchar.

13. A system comprising:
a processor; and
a computer-readable storage medium communicatively coupled to the processor and storing program instructions which, when executed by the processor, are configured to cause the processor to:
receive, by a connector and from a first application, a first request for a set of data, wherein the set of data is stored in a first data source of a plurality of data sources and the first request includes a requested codepage and the requested codepage identifies a character set that will be used to display the results of the data request;
obtain, by the connector, from the first data source, a first codepage associated with the first data source, wherein the first codepage identifies a character set associated with the set of data, the first data source is a remote data source, and the connector obtains a column level codepage for relevant columns;
add, for the first codepage, a first virtual coded character set identifier (VCCSID) in a first catalog entry of a catalog, wherein the first VCCSID is added to a nickname column and the catalog entry with the first VCCSID identifies the first codepage and the set of data;
determine, by the virtualization manager, the requested codepage does not match the VCCSID;
obtaining, by the connector, the set of data from the first data source;
performing, by the virtualization manager and in response to the determining, a codepage conversion on the set of data, wherein the conversion includes a character set conversion;
allowing a maximum of one codepage conversion;
returning, by the connector, the set of data to the application; and
displaying the set of data.

14. The system of claim 13, wherein the maximum of one codepage conversion is in response to determining the requested codepage does not match the first VCCSID.

15. The system of claim 14, wherein the program instructions are further configured to cause the processor to:
receive, from a second application, a second request for a second set of data, wherein the set second of data is stored in a second data source and the second request includes a second requested codepage;
obtain, from the second data source, a second codepage, wherein the second codepage identifies a second character set associated with the second set of data;
add a second VCCSID to the catalog, wherein the second VCCSID is added to the nickname column of the catalog;
determine the second requested codepage matches the second VCCSID; and
send the second set of data to the second application, wherein the second set of data does not undergo a codepage conversion.

16. The system of claim 13, wherein the first data source is a first column.

17. A computer program product, the computer program product comprising a computer readable storage medium having program instructions embodied therewith, the program instructions executable by a processing unit to cause the processing unit to:
receive, by a connector and from a first application, a first request for a set of data, wherein the set of data is stored in a first data source of a plurality of data sources and the first request includes a requested codepage and the requested codepage identifies a character set that will be used to display the results of the data request;
obtain, by the connector, from the first data source, a first codepage associated with the first data source, wherein the first codepage identifies a character set associated with the set of data, the first data source is a remote data source, and the connector obtains a column level codepage for relevant columns;
add, for the first codepage, a first virtual coded character set identifier (VCCSID) in a first catalog entry of a catalog, wherein the first VCCSID is added to a nickname column and the catalog entry with the first VCCSID identifies the first codepage and the set of data;
determine, by the virtualization manager, the requested codepage does not match the VCCSID;
obtaining, by the connector, the set of data from the first data source;
performing, by the virtualization manager and in response to the determining, a codepage conversion on the set of data, wherein the conversion includes a character set conversion;
allowing a maximum of one codepage conversion;
returning, by the connector, the set of data to the application; and
displaying the set of data.

18. The computer program product of claim of claim 17, wherein the maximum of one codepage conversion is in response to determining the requested codepage does not match the first VCCSID.

19. The computer program product of claim 18, wherein the program instructions are further configured to cause the processing unit to:
receive, from a second application, a second request for a second set of data, wherein the set second of data is stored in a second data source and the second request includes a second requested codepage;
obtain, from the second data source, a second codepage, wherein the second codepage identifies a second character set associated with the second set of data;
add a second VCCSID to the catalog, wherein the second VCCSID is added to the nickname column of the catalog;
determine the second requested codepage matches the second VCCSID; and send the second set of data to the second application, wherein the second set of data does not undergo a codepage conversion.

20. The computer program product of claim of claim 17, wherein the first data source is a first column.

* * * * *